United States Patent Office 3,204,711
Patented Sept. 7, 1965

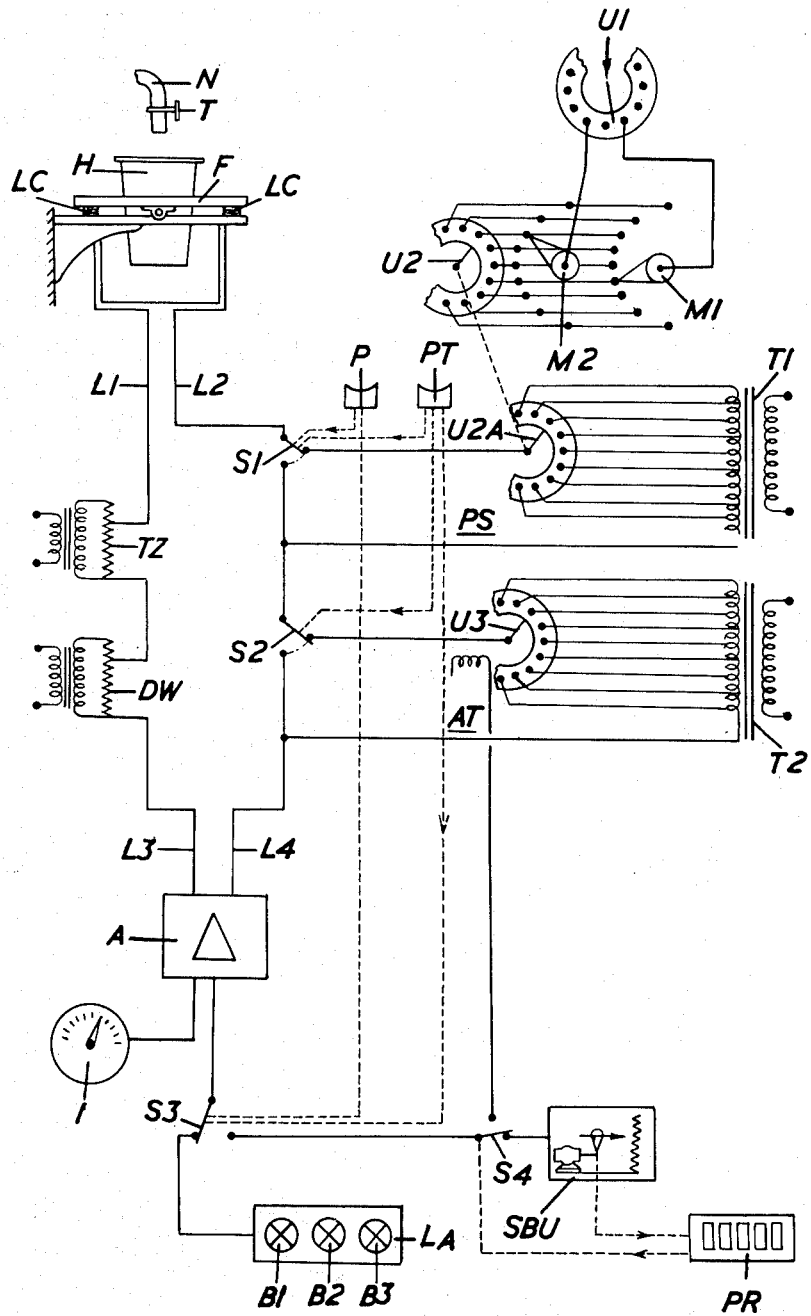

3,204,711
BATCH WEIGHING APPARATUS
Campbell Dean Boadle, Caerleon, and David Warwick Lloyd Clamp, Cwmbran, England, assignors to Girling Limited, Tyseley, Birmingham, England, a British company
Filed Feb. 26, 1964, Ser. No. 347,576
11 Claims. (Cl. 177—70)

This invention relates to batch weighing apparatus. One known method of weighing out batches of two or more ingredients involves feeding a first ingredient to a weighing hopper until the total weight reaches a required reading, adding the next ingredient until the weight reaches a new total, and so on. A drawback of this method is that an error in the weighing of one ingredient has a cumulative effect which can upset the relative proportions of the ingredients in the batch by a much greater percentage than the percentage error in the weighing of that one ingredient. For example if one requires a batch to contain 40 lb. of an ingredient A and 20 lb. of an ingredient B, and the operator allows 41 lb. of the ingredient A into the weighing hopper (a 2½ percent error) the ingredient B is added until a total of 60 lb. is reached, so only 19 lb. of ingredient B has been added. The relative proportions are thus 41 to 19 instead of 2 to 1, an error of approximately eight percent. Where several ingredients are involved the error can be even higher.

In practice it is difficult for the operator to stop the flow of an ingredient at just the right moment and errors of the order indicated are difficult to avoid. It is an aim of the invention to overcome the cumulative effect of such errors, and to give the same accuracy in this successive addition method of weighing as can be obtained by weighing out the individual ingredients separately, yet to retain the control over the overall weight of the batch.

According to the invention there is now proposed a batch weighing system including a hopper to which predetermined quantities of a number of different ingredients can be added in turn to make up a recipe, the hopper being mounted on weighing means including at least one electro-mechanical transducer, the electrical output of which can be used in a circuit to determine the weight of the contents of the hopper, in which means are provided for acting, on completion of the addition of an ingredient, for transferring the information on the weight of that ingredient to a separate information store, and for re-setting the electrical weight-determining circuit effectively to zero in preparation for the addition of a further ingredient.

The process is repeated for each ingredient in turn, and it will be seen that whilst the basic system weighs each ingredient to the limits of the operators' ability, without being affected by any errors in the weights of the preceding ingredients, the weights of all the ingredients are stored, and also the total weight of the batch can also be obtained.

The weighing may be carried out by comparing the electric signal representative of the weight with a signal from a standard source, the magnitude of the standard signal being altered appropriately for each ingredient in turn. As the weight of the ingredient approaches the required value the difference between the signals decreases and this difference signal can be amplified and used to indicate to the operator when the correct value is being approached. For example it could control three lamps, one of which is illuminated as long as the weight is below the desired value, a second of which lights up as the required value is approached, and then both of these go out at the balance condition; lighting up of the third lamp indicates over-weight conditions.

The electric signals are preferably in the form of voltages, the weight signal being the voltage output of a load cell, or a combination of the voltages of two or more load cells.

According to a further important feature of the invention the signal transferred from the weight-determining circuit is not that representing the intended weight of the ingredient, but of the actual weight added. This can be achieved by including a self-balancing potentiometer in the balancing system so that, when the operator has shut off the feed of the ingredient, the self-balancing potentiometer operates to produce a voltage equal to the output of the load cells, and it is this voltage that is transferred and recorded, if desired, by printing out.

The invention will now be further described and illustrated by way of example with reference to the accompanying drawing, which is a circuit diagram of an automatic weighing system.

The invention is shown applied to a system in which, for example, a recipe is to be made up in a hopper H, by admitting several different ingredients in turn through respective nozzles, one of which is shown at N, controlled by manual means indicated diagrammatically as a T. The ingredients may be in powdered or granular form and used, for example, to make up a soup recipe. The hopper is mounted in trunnions in a frame F supported on electro-mechanical transducers, known as load cells and indicated at LC. In the embodiment shown three such cells are used in order to form a stable base for the frame F, but only two are visible. It will be understood that the number of cells could be different from this, for example there may only be one cell, or as many as four or more.

These cells LC produce electrical voltage outputs proportional to the applied load and their outputs are combined to produce across leads L1 and L2 a voltage which is proportional to the total weight of the hopper, its ingredients, and the frame F. In practice the outputs of the cells are used to modulate an alternating current supply, so the voltage across the leads L1 and L2 is an alternating one.

In series with this voltage are connected two potentiometers DW and TZ, each connected across a source of alternating voltage. The potentiometer DW produces a voltage opposing that across the leads L1 and L2 and is adjusted so as to cancel out the voltage representing the dead weight of the hopper H and the frame F (together with any ancillary equipment they carry), so that the net voltage is solely that of the ingredients. The other potentiometer TZ gives a fine adjustment to allow the operator to set the net voltage accurately to zero when the hopper is empty. However, if desired, a single potentiometer could be used instead of the two, DW and TZ.

Also in series with the voltage across the leads L1 and L2 is a circuit PS producing a voltage representing (as will be explained later) the pre-set weight of each ingredient to be added in turn, and a circuit AT producing a voltage which represents the weight of ingredients added so far during each weighing-out cycle. Each of these likewise opposes the voltage across the leads L1 and L2 and the net output voltage or difference voltage is applied through leads L3 and L4 to the input of an amplifier A. The output of this amplifier can be connected at will by a switch S3 either to a lamp annunciator unit LA, containing three lamps B1, B2 and B3, or to a self-balancing potentiometer unit SBU, the moving slider of which is also connected to the printing wheels of a printer PR in a manner such that the figure displayed by the printing wheels is representative of the position of the slider of the potentiometer, which in its turn is representative of the weight signal at the output of the amplifier.

The above is a brief outline of the circuit and the details will become more apparent as we now proceed with a description of its operation. The purpose of the pre-set weight circuit PS is to produce in succession a number of predetermined voltages representing the weights of the successive ingredients to be added. These voltages are set up by means of multi-contact switches, of which only two are shown by way of example at M1 and M2, each associated with a respective ingredient. When the arm of a uniselector U1 steps on to reach that contact which is connected to the moving contact of switch M1 the lead connected to that fixed contact of the switch to which the switch has been set becomes energised and uniselector U2 starts hunting round until it stops at the contact connected to this lead. A further arm U2A on the shaft of this uniselector then rests on a corresponding contact connected to one of a number of tappings on the secondary winding of a transformer T1. The voltage on this tapping thus becomes connected into the weighing circuit via the switch S1.

As will be described later, when one ingredient has been weighed out and the weighing mechanism is ready to weigh out a further ingredient, the uniselector U1 is advanced one step; it then connects a voltage to the slider of switch M2 and thence to a different contact of the uniselector U2 from that previously energised (assuming the weight set on the switch M2 is different from that on the switch M1). The uniselector U2 then steps on to this new position and its arm U2A connects the new voltage value into the weighing circuit.

The simple arrangement shown would severely limit the accuracy of the weighing to the number of contacts available on the switches M1, M2, etc. and on the uniselector U2. In practice there would be a number of such switches associated with each ingredient, for example one selecting the weight in thousands of pounds, a second in hundreds, a third in tens and a fourth in units of one pound. There would then be four uniselectors U2 and four transformer secondary windings (although these could all be on one and the same transformer T1).

Instead of being set up manually by means of the switches M1, M2, etc., the voltages representing the weights of the successive ingredient could be set up in response to recipe information obtained, for example, from punched cards, from magnetic tape, or from boards carrying electric plugs or contacts at selected positions.

Consider now the position at the start of a weighing operation. The hopper H is empty, the dead-weight potentiometer DW cancels out the weight of the hopper and frame, and the potentiometer TZ has been adjusted to ensure that the net output between leads L3 and L2 is zero. The output of the circuit AT is zero. The required weights of the successive ingredients have been set up in the circuit PS by the switches M1, M2, etc., and the uniselector U1 causes the uniselector U2 to connect the first of these voltages in opposition to that from the cells LC. There is therefore a substantial input signal to the amplifier A, and this illuminates the lamp B1 of the annunciator LA, to which the amplifier is connected at this time.

An approximate-weight indicator I connected to the output of the amplifier A gives the operator a rough idea of the rate at which the material is being added and then, as the weight approaches the correct amount, the lamp B1 goes out and the lamp B2 comes on, this being arranged to occur when the output signal of the amplifier falls below a predetermined figure. Then, when the weight reaches the pre-set figure and the output of the amplifier A is zero the light B2 goes out. On observing this the operator closes the tap T to halt the feed. If the weight added is appreciably in excess of the desired value, this fact is signalled by illumination of the lamp B3.

The operator then presses a button P, which we call the "Print" button and which in practice is mounted on the printer PR. This simultaneously acts on a switch S1 to switch out the pre-set voltage from the circuit PS, and, by means of the switch S3, switches over the output of the amplifier A from the annunciator LA to the self-balancing potentiometer unit SBU. The potentiometer is driven until its slider has moved to a voltage which equals the voltage at the output of the amplifier A which, in its turn, represents the weight of the first ingredient that was actually added. At the same time the potentiometer is turning the wheels of the printer PR. When it comes to rest it automatically causes the printer to operate to print onto a paper tape (or punch onto a tape or card) the figure then reached, which is the weight of the first ingredient added. The completion of this printing operation is arranged to send signals automatically to a switch S4 to disconnect the output of the amplifier A from the potentiometer unit SBU, and to connect it instead to a uniselector U3 to bring into action the automatic tare weight balancing circuit AT. The output of the amplifier acts on a relay (not shown) to energise the coil of the uniselector so that the wiper of the uniselector steps from tapping to tapping of the secondary winding of a transformer T2 until it reaches a tapping producing a voltage such that the output of the amplifier A is reduced to substantially zero, at which point the uniselector U3 halts. The voltage supplied by the circuit AT is then equal and opposite to the net voltage between leads L3 and L2 (the circuit PS being still switched out). The voltage in the circuit AT now represents the actual weight of the first ingredient added.

At this stage in the description it should be observed that the weight printed out by the printer PR (and also the automatic tare weight adjustment inserted by the circuit AT) is not the pre-set weight of the first ingredient that it was intended to add, but the actual weight added. Consequently any inaccuracy in the adding of the first ingredient will not lead to any cumulative error in the weighing out of the second and subsequent ingredients. The same is true of each ingredient added, namely, that errors in the accuracy of its addition have no effect on the accuracy with which the remaining ingredients are added.

The output of the amplifier A is now re-connected to the annunciator LA by means of the switch S3 and also the uniselector U1 is advanced one step to cause the uniselector U2 to connect into the circuit PS the pre-set voltage representing the desired weight of the second ingredient. Everything is now ready for addition of the second ingredient and the sequence of operations occurs as before, with the operator halting delivery of the second ingredient when the lamp B2 goes out and pressing the button P to print out the actual amount added and also to add into the circuit AT the weight of the second ingredient.

The same sequence is repeated for each of the ingredients to be added and there can be as many ingredients as there are steps in the uniselector U1 and sets of switches M1, M2 etc. It will be appreciated that in each sequence, after the circuit AT has been automatically adjusted but before the new pre-set voltage has been connected into the circuit PS, the net voltage output across the leads L3 and L4 is zero, irrespective of any errors in the or each preceding weighing.

When the last ingredient has been added the operator presses a button PT, which, like the button P, is mounted in practice on the printer PR. This button PT, known as the "Print Total" button acts not only on the switch S1 to switch out the circuit PS but also on the switch S2 to switch out the circuit AT. Like the button P it also acts on switch S3 to disconnect the annunciator LA and connect the self-balancing potentiometer unit SBU. The output of the amplifier A is now representative of the whole net weight of all the ingredients added, and the potentiometer slider halts when this figure is reached. The figure, showing the total weight added, is automatically printed out.

It should be noted that the total weight printed out is arrived at by direct measurement of the total, not by adding together the weights of the individual ingredients, again avoiding any cumulative errors.

In a modification of the arrangement illustrated the flow of the ingredients into the hopper may be controlled automatically instead of manually. For example the output of the amplifier A, instead of or in addition to controlling the annunciator LA, could control the tap T for each ingredient in turn. In another possible modification the hopper H is removed bodily for emptying instead of being discharged by tilting.

We claim:

1. A batch weighing system comprising weighing means a material-receiving hopper on said weighing means, an electro-mechanical transducer producing an electrical voltage output signal in response to the deflection of said weighing means, a weight-determining circuit comprising first voltage-generating means producing a voltage dependent on the tare weight of said hopper and its associated parts, second voltage-generating means generating a voltage dependent on the desired weight of material in said hopper, voltage storing means containing a voltage representing the weights of ingredients previously added to the hopper, voltage-comparing means comparing the said desired weight voltage with the difference between the said output voltage signal and the sum of the voltages of said two voltage-generating means, and indicating means responsive to the balanced condition of said voltage-comparing means.

2. A batch weighing system as set forth in claim 1 including voltage-transferring means responsive to operation of said indicating means and acting to transfer said voltage output signal to said voltage storing means.

3. A batch weighing system as set forth in claim 1 wherein said second voltage generating means comprise a plurality of voltage sources and a switching device capable of connecting each of said sources in turn into said weight-determining circuit.

4. A batch weighing system as set forth in claim 1 wherein said second voltage generating means comprise a plurality of voltage sources and a uniselector capable of connecting each of said sources in turn into said weight-determining circuit.

5. A batch weighing system as set forth in claim 1 including cancelling means capable of disconnecting the voltage from said voltage-storing means, and a connection between said cancelling means and said indicating means allowing indication of said voltage output signal without opposition by the voltage from said voltage-storing means.

6. A batch weighing system comprising weighing means, a material-receptacle mounted on said weighing means, an electro-mechanical transducer connected to said weighing means and producing a first electrical signal in dependence on the weight thereon, means producing a plurality of second electrical signals in succession, each representing a standard weight, a comparator circuit, said circuit comparing said first electrical signal with one of said second signals, means responsive to a condition of balance between said first and second signals, a signal store, switching means associated with said condition-responsive means, said switching means serving to transfer said first signal to said store, said store being connected in said comparator circuit in series with said second signal-producing means, and switching means serving to cancel said one second signal and replacing it by a successive second signal.

7. A batch weighing system as set forth in claim 6 including weight-recording means, said weight-recording means being connected to said comparator to record the weight value represented by said first signal.

8. A batch weighing system as set forth in claim 6 wherein said condition-responsive means comprise an amplifier feeding a lamp annunciator.

9. A batch weighing system comprising weighing means, a material-receptacle mounted on said weighing means, an electro-mechanical transducer connected to said weighing means and producing a first electrical signal in dependence on the weight thereon, means producing a second electrical signal representing a desired weight of material, means generating a third electrical signal dependent on the weight of said receptacle, a signal store holding a fourth signal representative of the weight of material already present in the receptacle, a comparator circuit, said comparator circuit being connected to compare the difference between said first and third signals with the sum of said second and fourth signals, means responsive to a condition of balance of said comparator circuit, switching means serving to switch out said second signal and to add the resulting difference signal in said comparator circuit into said signal store to add to said fourth signal.

10. A batch weighing system as set forth in claim 9 wherein said switching means include a self-balancing potentiometer, said potentiometer generating a fifth signal which is equal to said difference and which is fed to said store.

11. A batch weighing system as set forth in claim 10 including weight-recording means, said weight-recording means being connected to said potentiometer to record said fifth signal.

References Cited by the Examiner

UNITED STATES PATENTS

| | | | |
|---|---|---|---|
| 2,764,399 | 9/56 | Porter | 177—12 |
| 2,873,107 | 2/59 | Lyons | 177—211 |
| 2,918,270 | 12/59 | Golding | 177—211 X |
| 2,938,701 | 5/60 | Thorsson et al. | 177—70 |
| 3,081,830 | 3/63 | Spademan | 177—2 X |

LEO SMILOW, *Primary Examiner.*